United States Patent

[11] 3,633,619

| [72] | Inventor | Herbert M. Eckerlin<br>Raleigh, N.C. |
|---|---|---|
| [21] | Appl. No. | 811,932 |
| [22] | Filed | Apr. 1, 1969 |
| [45] | Patented | Jan. 11, 1972 |
| [73] | Assignee | Corning Glass Works<br>Corning, N.Y. |

[54] BERNOULLI EFFECT FLUID PRESSURE CONVERTOR, SWITCH, AMPLIFIER AND THE LIKE
7 Claims, 4 Drawing Figs.

| [52] | U.S. Cl. | 137/608,<br>137/81.5 |
|---|---|---|
| [51] | Int. Cl. | F15c 3/14 |
| [50] | Field of Search | 137/81.5,<br>608 |

[56] References Cited
UNITED STATES PATENTS

| 3,034,628 | 5/1962 | Wadey | 137/81.5 |
|---|---|---|---|
| 3,072,147 | 1/1963 | Allen et al. | 137/81.5 |
| 3,232,095 | 2/1966 | Symnoski et al. | 137/81.5 X |
| 3,393,692 | 7/1968 | Geary | 137/81.5 X |
| 3,420,255 | 1/1969 | Wilkerson | 137/81.5 |
| 3,429,324 | 2/1969 | Brown et al. | 137/81.5 |
| 3,472,257 | 10/1969 | Daruk et al. | 137/81.5 |
| 3,486,521 | 12/1969 | Mayer | 137/81.5 |
| 3,489,181 | 1/1970 | Boothe | 137/81.5 |

*Primary Examiner*—Samuel Scott
*Attorneys*—Clarence R. Patty, Jr. and Walter S. Zebrowski ABSTRACT: A means for controlling the pressure of a fluid output signal in accordance with the pressure of a fluid input signal applied to a Bernoulli air bearing. The bearing issues a fluid stream to provide a fluid cushion having an adjustable positive or negative pressure (relative to ambient) between the nozzled frontal surface of the bearing and a movable member, which member operates as a valve or restriction to control the pressure and flow rate of the fluid output signal as a function of the pressure of the fluid input signal.

BERNOULLI EFFECT FLUID PRESSURE CONVERTOR, SWITCH, AMPLIFIER AND THE LIKE

BACKGROUND OF THE INVENTION

In recent years fluid and fluidic control systems and instrumentation for industrial process control have come into popular use. Often a need arises to provide means whereby relatively high fluid pressure levels can be controlled with relatively low fluid pressure levels such as are ordinarily present in the control system. Further, there is often a need to provide means whereby the pressure level of liquidous working fluids commonly used in hydraulically operated machinery can be controlled by the pressure level of pneumatic fluids commonly employed in fluid and fluidic control systems.

The instant invention provides such means by taking advantage of the physical phenomenon often referred to as the Bernoulli effect. For a detailed explanation of the Bernoulli effect phenomenon and a device employing it, reference is made to my copending U.S. Pat. application entitled POSITIONING APPARATUS AND METHOD, Ser. No. 645,760, filed June 13, 1967.

SUMMARY OF THE INVENTION

It is therefore an object of the instant invention to provide means for controlling relatively high-pressure levels of one fluid with another fluid having relatively low-pressure levels.

It is a further object of the instant invention to provide means for controlling the pressure level of a hydraulic fluid with the pressure level of a pneumatic fluid.

Briefly, in accordance with the instant invention, there is provided a fluid pressure device such as a converter, switch, amplifier, or the like. A fluid conducting means is utilized for providing, under pressure, a fluid output signal. A fluid venting means communicates with the conducting means. A valve means is associated with the venting means for controlling the amount of fluid vented from the conducting means so as to affect the pressure level and flow rate of the output signal. At least one air bearing is operatively associated with the valve means for affecting the pressure level and flow rate of the output signal in accordance with the pressure level of a fluid input signal applied to the air bearing.

Additional objects, features and advantages of the instant invention will become apparent to those skilled in the art from the following detailed description and attached drawings on which, by way of example, only the preferred embodiment of the instant invention is illustrated.

DESCRIPTION OF THE PREFERRED EMBODIMENTS

Figure 1:
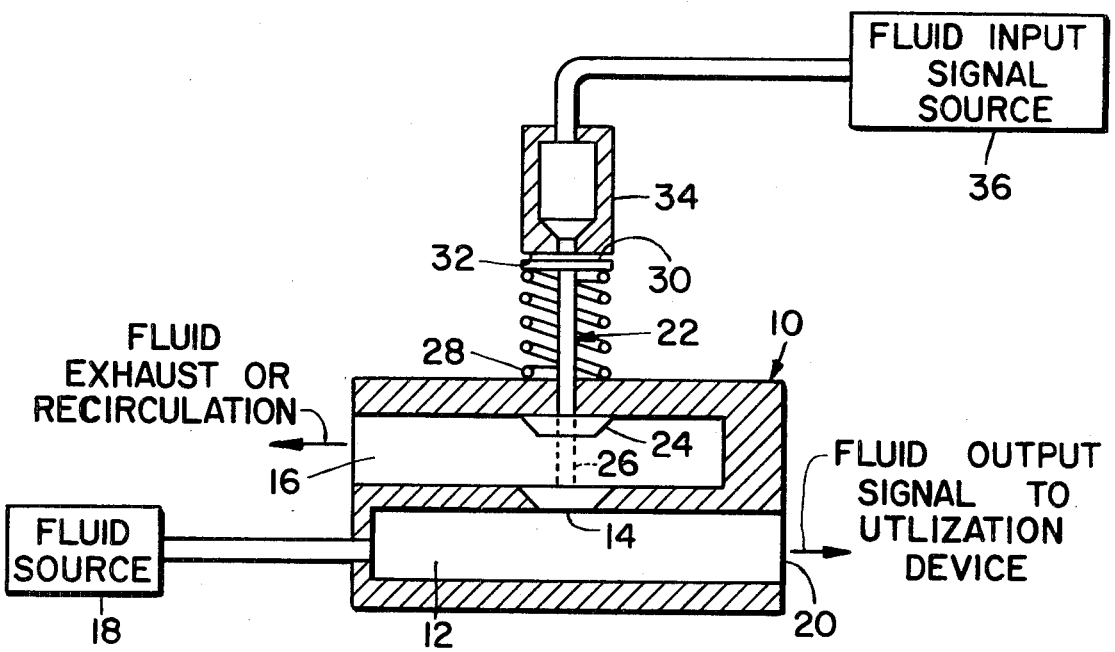
FIGS. 1-3 are partially schematic cross-sectional views of a fluid pressure converter or switch illustrating three separate embodiments of the instant invention.

Referring to FIG. 1 there is shown a housing or body 10 defining a fluid conductive channel or passage 12 therethrough. An aperture 14 in a defining wall of the passage 12 permits a fluid present in the passage 12 to be at least partially vented therethrough into a cavity or chamber 16. From thence the fluid may be exhausted from the body 10 or recirculated in any suitable and well-known manner through a fluid source 18 and back to the passage 12. That portion of the fluid in the passage 12 not vented through the aperture 14 eventually flows to an outlet port 20 where it is available for utilization as a pressurized fluid output signal. The output signal, which may be either a gaseous compressible fluid such as air or an incompressible fluid such as water or oil, can be utilized in numerous suitable and well-known ways, not shown, such as to operate fluid-driven machinery or to be sensed by fluid-sensitive instruments.

The amount or quantity of fluid vented from the passage 12 through the aperture 14 is controlled by suitable valve means, as in this example, by a movable plunger 22 having an end portion 24 tapered in conformity with the aperture 14 so as to seat therein when the plunger 22 is in a fully extended position as represented by dashed lines 26. The plunger 22 is shown in a normally fully retracted position which position allows maximum venting of the fluid from the passage 12 into the cavity 16. The fully retracted position of the plunger 22 is maintained due to the influence of a coiled spring 28 which functions as a biasing means for the plunger 22.

End 30 of the plunger 22 is disposed adjacent and substantially parallel to a flat nozzled end 32 of an air bearing 34. The plunger 22 is movable toward and away from the aperture 14 as a function of the pressure of a fluid cushion generated between the nozzled end 32 and the end 30 by the air bearing 34. Such an air cushion is formed by reason of a fluid stream issuing from the bearing 34 and impinging on the end 30 when a fluid input signal of suitable pressure is applied to the bearing 34 from a fluid input signal source 36.

The typical operation of the converter of the instant example is as follows: With no input signal applied to the bearing 34, the plunger 22 is in its normal fully retracted position as shown. With a fluid flowing in the passage 12, being supplied by the source 18, a quantity of the fluid is vented through the aperture 14 and is thereafter recirculated to the source 18. Because of this venting action the pressure of the fluid output signal reaching the outlet port 20 is relatively low.

To increase the output signal pressure at the port 20, a fluid input signal is applied to the bearing 34 having sufficient pressure to produce a positive pressure fluid cushion, relative to ambient, between the end 32 and end portion 30 in opposition to the force exerted on the plunger 22 by the biasing spring 28. Such an input signal pressure urges the plunger 22 toward the aperture 14. However, the positive condition of the cushion in a first range of pressures from 0 p.s.i. upward, referred to as the lubricating region, has only a minimal affect on the movement of the plunger 22.

In accordance with the Bernoulli effect, when the pressure of the input signal supplied to the bearing 34 is increased sufficiently, the pressure of the fluid cushion between the end portion 30 and the end 32 becomes negative (relative to ambient). This second range of input signal pressures, causing the generation of a negative fluid cushion, is called the Bernoulli effect region. When this condition of the fluid cushion exists, ambient pressure on the opposite side of the end portion 30 urges the plunger 22 toward its fully retracted position, as shown, aided by the tension forces of the biasing spring 28.

Now, if the input signal pressure to the bearing 34 is increased still further, an input signal pressure level is eventually reached at which the pressure of the fluid cushion again becomes positive, relative to ambient pressure. Thereafter, further increases in input signal pressure produce fluid cushions having increased positive pressures relative to ambient. This third pressure region is often referred to as the jet impact region. Input signal pressures in this region tend to urge the plunger 22 toward the aperture 14 to raise the output signal pressure at the port 20.

Figure 2:
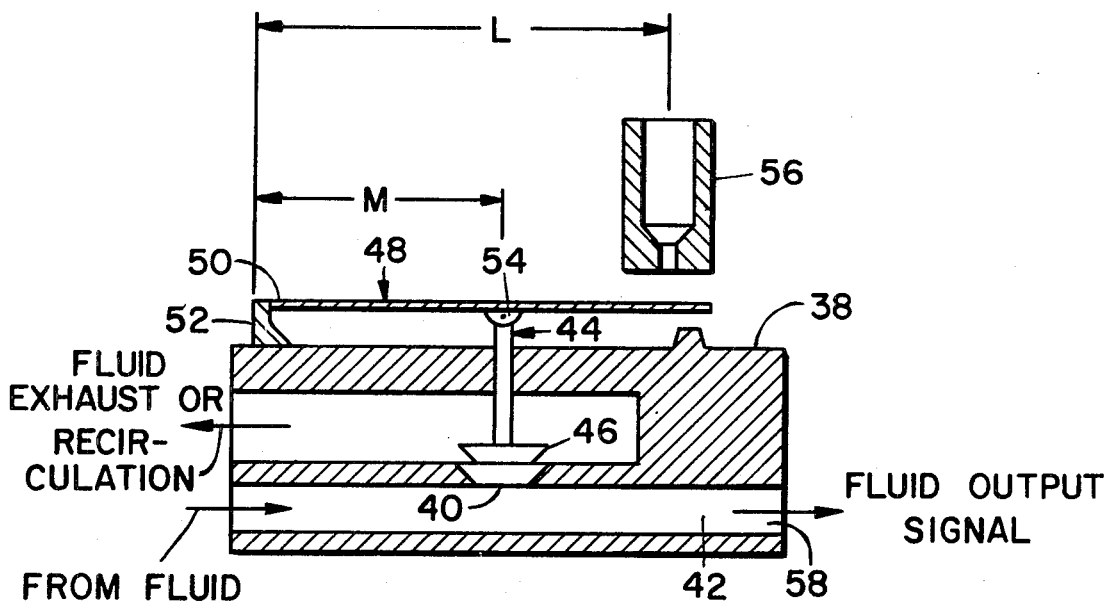

Referring now to FIG. 2 there is shown another way in which biasing means can be provided to produce different output signal responses to input signal pressures. A housing or body 38 is shown as in the previous example having an aperture 40 communicating with a fluid conductive passage 42. A plunger 44 is disposed so that end portion 46 is centered intermediate a fully advanced and fully retracted position. A switch arm 48 consisting of an elongated and relatively thin strip of preferably rigid material is rigidly mounted at one end 50 to a spacer block 52 affixed to the body 38. End 54 of the plunger 44 is pivotally attached to the arm 48 so that the plunger 44 will advance and retract in accordance with deflections of the arm 48 from its centered position as shown.

An air bearing 56, of the same character as previously described is disposed opposite the arm 48 at any convenient point along the length thereof. The pressure of the fluid cushion between the bearing 56 and the arm 48 necessary to deflect the arm 48 and move the plunger 44 will depend on the moment arm length L. The length L can be adjusted as desired to produce the required output signal pressure changes at a port 58 in response to a given input signal pressure change in the bearing 56.

By increasing the moment arm length L relative to the distance M, between the end 50 and the point of attachment of the end 54, a given change in cushion pressure between the bearing 56 and the arm 48 will affect a greater change in output fluid pressure at the port 58. Similarly, by decreasing the distance L relative to the distance M, larger cushion pressures will be required in order to affect a given output signal pressure change at the port 58. Thus by altering the moment arm L relative to the length M, the gain or amplification factor of the converter can be adjusted.

A typical operation of the instant example is as follows: Where the input signal pressure applied to the bearing 56 is not sufficiently high to produce deflection of the arm 48, the plunger 44 occupies an intermediate position as shown and a moderate amount of fluid is vented from the passage 42 through the partially obstructed aperture 40. The output signal pressure at the port 58 is therefore of intermediate value. As the input signal pressure in the bearing 56 is increased to increase the positive fluid cushion pressure between the bearing 56 and arm 48 in the lubricating region, the arm 48 deflects away from the bearing 56 so as to advance the plunger 44 toward the aperture 40 thus raising the output signal pressure at the port 58 toward a higher level. The increase in input signal pressure in this region has only a relatively slight effect on the offcenter positioning of the plunger 44 and, consequently, on the output signal pressure changes at the port 58. As the input signal pressure increases to the point where the fluid cushion becomes negative relative to ambient pressure, the arm 48 is deflected in the opposite direction past its intermediate position as shown toward the bearing 56. Accordingly, the plunger 44 is retracted past its intermediate position, as shown, away from the aperture 40 so as to increase the quantity of fluid vented from the passage 42 and decrease the output signal pressure at the port 58.

Figure 3:
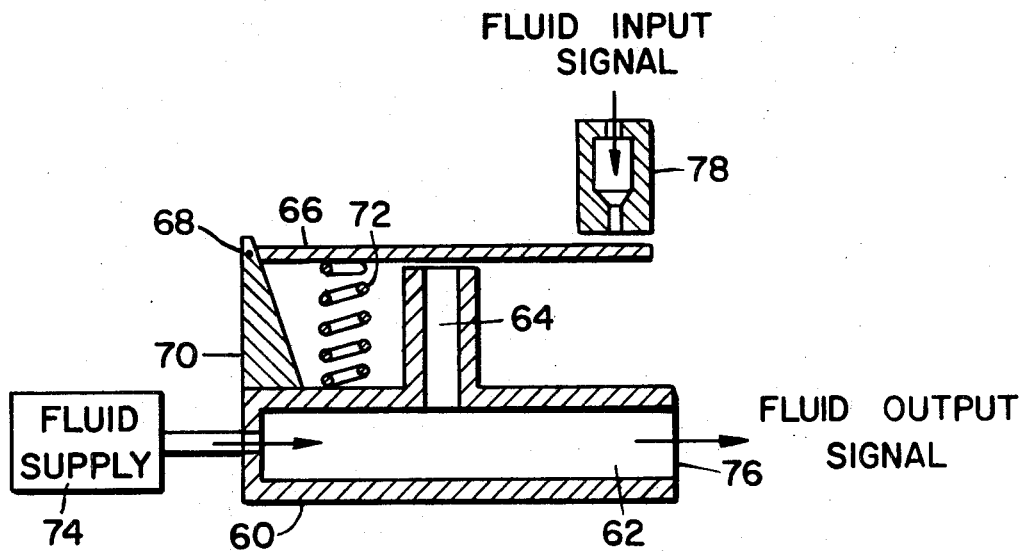

Referring now to FIG. 3 there is shown a body 60 defining a fluid passage 62 communicating with a vent passage 64. A switch arm 66 is pivotally attached at one end 68 to a suitable spacer block 70 affixed to the body 60. The switch arm 66 is normally maintained in a center position, as shown, by means of a biasing spring 72. A fluid supplied to the passage 62 by means of a suitable fluid supply 74 is partially vented through the passage 64. The unvented portion of the fluid in the passage 62 is conducted to an output port 76 where it is available for utilization as a fluid output signal. The spring 72 is selected so that in its unstressed state the arm 66 is a suitable distance from the open end of the passage 64. A sufficiently positive pressure fluid cushion generated between an air bearing 78 and the arm 66 forces the arm 66 to pivot toward the end of the passage 64 reducing the outflow of fluid therefrom, compressing the spring 72, and increasing the output signal fluid pressure at the port 76. A sufficiently negative cushion pressure between the bearing 78 and the arm 66 causes the arm 66 to pivot away from the center position, as shown, toward the bearing 78 to permit increased quantities of fluid to be vented from the passage 64. Accordingly, the spring is expanded under tension and the output signal fluid pressure at the port 76 is decreased.

Figure 4:
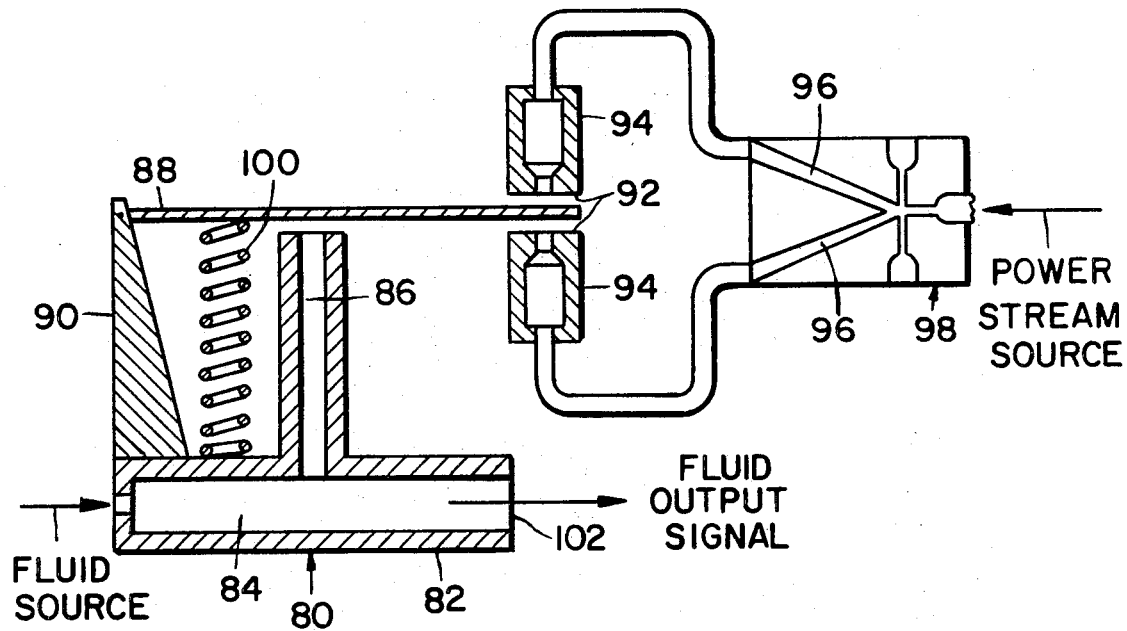
FIG. 4 is a partially schematic cross-sectional view of a fluid pressure pulse generator or switch illustrating another embodiment of the instant invention.

Referring to FIG. 4 there is shown a fluid switch or fluid pulse generator 80 having a body 82 defining a fluid conducting passage 84. A vent 86 communicates with the passage 84. As in the previous example, a switch arm 88 is pivotally mounted at one end to a spacer 90 affixed to the body 82. The arm 88 extends away from the spacer 90 over the end of the vent 86 and between the nozzled frontal surfaces 92 of a pair of oppositely disposed air bearings 94. Fluid to drive each air bearing 94 is supplied from a different outlet passage 96 of a conventional bistable fluidic device 98 such as a flip-flop or the like. The arm 88 is suitably biased by a spring 100 so as to maintain a normally centered position between the surfaces 92 as shown.

The typical operation of the switch or generator 80 is as follows: At a given time fluid is supplied from one of the outlet passages 96 to one of the air bearings 94 connected in fluid receiving relation thereto. No fluid is supplied to the other of the bearings 94 during this time. Accordingly, the bearing 94 receiving an input signal from the device 98 is active and generates a fluid cushion between its frontal surface 92 and the arm 88. If this cushion has a positive pressure relative to ambient the arm 88 is deflected toward the other or passive bearing 94. On the other hand, if the pressure of fluid cushion generated by the active air bearing 94 is negative relative to ambient, the arm 88 is drawn toward it. In either case when the device 98 changes output states, the other bearing 94 becomes active and controls the deflection of the arm 88 depending upon the polarity of fluid cushion which results. If the device 98 is operated in a well known manner as an oscillator such that it undergoes a periodic or regular change in output state, the result is a periodic sudden change in fluid output signal pressure at the port 102. Accordingly, the device 80 operates as a periodic switch or pulse generator.

Note that while the one or more air bearings of the instant invention are operated with gaseous fluids such as air, nitrogen, or the like, the fluid signal whose pressure is being affected thereby may be either liquidous such as water, oil or the like, or may also be a gaseous fluid. The term "air bearing" as used in this specification is not to be construed as limited to air but rather to any desired compressible gaseous fluid, including air, such as nitrogen, helium, mixtures thereof, and the like.

It should also be noted that where an air bearing is operated by a gaseous fluid at a pressure at or near the transition from one pressure region to another, such as between the Bernoulli effect region and the jet impact region, there may be a tendency of the air bearing to oscillate between the two adjacent regions in an irregular manner. In order to avoid this possible situation, the bearing should be operated at a pressure well within the desired operating region unless such oscillation is desired or permissible.

Although the instant invention has been described with respect to specific details of certain embodiments thereof, it is not intended that such details limit the scope of the instant invention except insofar as set forth in the following claims.

I claim:
1. A fluid pressure device comprising fluid conducting means for transmitting a fluid output signal,
   fluid venting means communicating with said conducting means,
   valve means associated with sd venting means for affecting the pressure of said output signal, said valve means being operable in any intermediate position between fully open and fully closed, and
   at least one air bearing operatively associated with said valve means for affecting said output signal pressure in response to the pressure of a fluid input signal applied to said bearing.
2. The device according to claim 1 wherein said venting means comprises an apertured portion of said conducting means.
3. The device according to claim 1 wherein said valve means comprises
   a movable plunger adapted to present maximum obstruction to the venting of said fluid from said venting means when the pressure of said input signal is at least equal to a predetermined value, and
   plunger biasing means opposing said input signal for maintaining said plunger in a predetermined position relative to said venting means when the pressure of said input signal is less than said predetermined value.

4. The device according to claim 1 wherein said venting means comprises a linearly tapered passage communicating with said conducting means, said valve means including a movable plunger having a portion of one end tapered in conformity with said passage for seating therein in close fitting relationship when said plunger is in a fully advanced position, the other end of said plunger having a flat surface oppositely disposed from the nozzled end of said bearing, the position of said plunger along a centerline with said tapered passage being a function of the pressure of said input signal, said plunger being spring biased in opposition to said input signal in order to maintain said plunger in a predetermined position along said centerline when the pressure of said input signal is less than a predetermined value.

5. The device according to claim 1 wherein said valve means comprises a switch arm, a spacer block associated with said conducting means, said switch arm being pivotally attached at one end thereof to said spacer block, said venting means including a fluid passage communicating with said conducting means and extending outward therefrom, said switch arm extending from said spacer block across and adjacent the outward end of said passage and spaced therefrom when the pressure of said input signal is less than a predetermined value, said bearing being operatively associated with said arm so as to at least partially block said outward end with said arm when the pressure of said input signal is at least equal to a second predetermined value.

6. A fluid pressure switch comprising fluid-conducting means for transmitting a fluid output signal, a fluid passage communicating with said conducting means and extending outwardly therefrom, a switch arm pivotally mounted at one end in such a manner as to maintain a fixed position of said one end relative to said conducting means, said arm being adapted to at least partially block the flow of a fluid through the outward end of said passage when said arm is pivoted about said fixed position to any intermediate position through a maximum angle of advance, and a pair of air bearings disposed on opposite sides of said arm, one of said bearings being operatively associated with said arm to at least partially block said outward end of said passage with said arm under conditions of negative fluid pressure between said one of said bearings and arm, the other of said bearings being operatively associated with said arm to at least partially block said outward end of said passage with said arm under conditions of positive fluid pressure between said other of said bearings and arm.

7. A fluid pressure device comprising fluid-conducting means for transmitting a fluid output signal, said conducting means containing an aperture for venting at least a portion of a fluid from said conducting means, a movable valve adjacent said aperture, said valve being operable in any intermediate position between fully open and fully closed, for controlling the amount of said fluid vented through said aperture, at least one air bearing adapted to receive a fluid input signal, said bearing being operatively associated with said valve when the pressure of said input signal is at least equal to a predetermined value, and biasing means for maintaining said valve in a predetermined position in relation to said aperture when the pressure of said input signal is less than said predetermined value.

* * * * *